US007882171B1

(12) United States Patent
Mathieu, III et al.

(10) Patent No.: US 7,882,171 B1
(45) Date of Patent: Feb. 1, 2011

(54) AUTOMATIC DOWNLOAD PROVISIONING

(75) Inventors: Rudy Mathieu, III, Apache Junction, AZ (US); Keith Weiner, Queen Creek, AZ (US)

(73) Assignee: Avaya Inc., Basking Ridge, NJ (US)

( * ) Notice: Subject to any disclaimer, the term of this patent is extended or adjusted under 35 U.S.C. 154(b) by 880 days.

(21) Appl. No.: 11/482,498

(22) Filed: Jul. 8, 2006

(51) Int. Cl.
*G06F 15/16* (2006.01)

(52) U.S. Cl. ........................ 709/203; 717/168; 717/170; 717/172; 717/174; 717/176; 717/178; 709/204

(58) Field of Classification Search .................. 709/203
See application file for complete search history.

(56) References Cited

U.S. PATENT DOCUMENTS

| | | | | |
|---|---|---|---|---|
| 5,970,252 | A * | 10/1999 | Buxton et al. | 717/166 |
| 7,461,249 | B1 * | 12/2008 | Pearson et al. | 713/156 |
| 7,496,914 | B1 * | 2/2009 | Ling et al. | 717/178 |
| 2003/0097433 | A1 * | 5/2003 | Park et al. | 709/222 |
| 2003/0187957 | A1 * | 10/2003 | Huang et al. | 709/219 |
| 2003/0191758 | A1 * | 10/2003 | Majewski et al. | 707/3 |
| 2006/0031205 | A1 * | 2/2006 | Perkins et al. | 707/3 |
| 2007/0270664 | A1 * | 11/2007 | Ishii et al. | 600/300 |
| 2008/0098006 | A1 * | 4/2008 | Pedersen et al. | 707/10 |
| 2009/0031141 | A1 * | 1/2009 | Pearson et al. | 713/187 |

OTHER PUBLICATIONS netTalk User manual, Feb. 2006, Interlink-Global.com.*
Interlink-Global, "netTalk Video Phone User's Manual," Feb. 2006, 27 pages, www.interlink-global.com.

* cited by examiner

*Primary Examiner*—Kevin Bates
*Assistant Examiner*—Arvin Eskandarnia
(74) *Attorney, Agent, or Firm*—Withrow & Terranova, PLLC

(57) ABSTRACT

An automatic download provisioning system and method that includes appending an Installer into a Loader, gathering UserInfo, injecting the UserInfo into the Loader, and using the Loader to write the UserInfo into a Registry of a user computer. One preferred embodiment includes the steps of appending an Installer to a Loader having a Static Buffer, posting the Loader on the Web Server, gathering UserInfo, injecting the UserInfo into the Static Buffer, and transmitting the Loader to the user computer. Another preferred embodiment includes means for receiving a Loader having a Static Buffer and an appended Installer, means for gathering UserInfo, means for injecting the UserInfo into the Static Buffer, and means for transmitting the Loader to the user computer.

25 Claims, 8 Drawing Sheets

INTERNET SERVICE

Name: Joe Cool
Address:
Phone No.:
Password:
Access Level:
Preferences:

ACCEPT & INSTALL

FIG. 6

AUTOMATIC DOWNLOAD PROVISIONING

COPYRIGHT NOTICE

A portion of the disclosure of this patent document contains material which is subject to copyright protection. The copyright owner has no objection to the facsimile reproduction of the patent disclosure, as it appears in the Patent and Trademark Office patent files or records, but otherwise reserves all copyright rights whatsoever.

REFERENCE TO A COMPUTER PROGRAM

A computer program listing Appendix A is submitted on a compact disc and the material (including Appendix A.txt which contains the following software components: main.c, main.h, main.c, dwpacct.h, dwpacct.c, download.php, and webpage.htm) on the compact disc is herein incorporated by reference.

The single compact disc (submitted in duplicate) includes a single file (Appendix A.txt, Jul. 8, 2006, 42 KB) with portions of an exemplary computer code implementing one preferred embodiment of the present invention.

BACKGROUND OF INVENTION

The present invention is directed to automatic download provisioning.

Internet Service can be defined as a data or voice service that is accessed through the Internet. One class of Internet Service exists that can be used from a web browser without a separate software download of an Application that connects to and operates the Internet Services. Another class of Internet Service exists that requires a separate software download of an Application that connects to and operates the related Internet Services. Although there are many reasons for requiring a separate software download of an Application, the main reasons generally relate to performance, persistence, hardware integration, feature requirements, and/or technical and non-technical reasons.

Service Provisioning is the process of creating an account on an Internet service provider's network to allow a user to use the Internet Service. Methods exist in which a website performs Service Provisioning and transmits UserInfo (which is the data that is specific to a particular user) either by displaying the UserInfo on a web page (of the website) or by sending the UserInfo via email. The Application is transmitted in a separate download. The user must type in or paste the UserInfo manually.

Conventional methods cannot embed UserInfo into a downloadable software program that connects to and operates a data or voice service that is accessed through a network (e.g. Internet Services). One reason that conventional methods cannot accomplish this is because the software program that is to be downloaded is actually an Installer. Conventional Installers are not designed to have data written into them at download time. Attempting to do so would overwrite critical code or data, and break (e.g. corrupt) the Installer.

BRIEF SUMMARY OF THE INVENTION

The present invention is directed to an automatic download provisioning system and method that includes appending an Installer into a Loader, gathering UserInfo, injecting the UserInfo into the Loader, and using the Loader to write the UserInfo into a Registry of a user computer.

One preferred embodiment of the present invention is a method providing an automatic download provisioning system for downloading an Application that connects to and operates a data or voice service. This embodiment is at least partially implemented on a Web Server for access by at least one user computer having a Registry. Preferably, this method includes the steps of appending an Installer to a Loader having a Static Buffer, posting the Loader on the Web Server, gathering UserInfo, injecting the UserInfo into the Static Buffer, and transmitting the Loader to the user computer. This method may also include the steps of receiving the Loader from the Web Server on a user computer, extracting the Installer from the Loader, writing the UserInfo into the Registry of the user computer, and/or installing the Application onto the at least one user computer.

Another preferred embodiment of the present invention is an automatic download provisioning system for downloading an Application that connects to and operates a data or voice service. The system may be at least partially implemented on a Web Server accessed by a user computer having a Registry. In this preferred embodiment, the system includes means for receiving a Loader having a Static Buffer and an appended Installer, means for gathering UserInfo, means for injecting the UserInfo into the Static Buffer, and means for transmitting the Loader to the user computer. This system may also include means for appending the Installer into the Loader, means for writing the UserInfo into the Registry of the user computer, means for extracting the Installer onto the user computer, and means for installing an Application onto the user computer.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 6 is an exemplary simplified screen view of an Internet Service web page accessed by a user.

DETAILED DESCRIPTION OF THE INVENTION

As discussed above, conventional methods cannot embed UserInfo into a downloadable program that connects to and operates a data or voice service that is accessed through a network (e.g. the Internet).

One potential approach to embedding UserInfo into a downloadable program (Application) would be to send the UserInfo in a file separate from the Application. But there are two critical problems with this approach. First, a single download offers a simpler user experience (with far less chance for error). Second, the Application would have no feasible way to determine where the UserInfo file was placed within the Application.

Another approach to embedding UserInfo into a downloadable program (Application) would be to download a small dedicated program that would then make its own connection to the server to download the Installer and UserInfo. The problem with this approach is that this dedicated program would not have access to the web session, and thus the Web Server could not trust the dedicated program to receive the UserInfo. This dedicated program could be run days or weeks after download. In this approach, authentication is an intractable problem.

The present invention is directed to an approach to automatic download provisioning. Automatic download provisioning uses a Loader 10 (shown as 10a, 10b, and 10c in FIGS. 1-3 respectively) having a Static Buffer 12 (into which UserInfo 14 may be injected) and an appended Installer 16 to install an Application (the code for which is included in the Installer and shown as Application Code 18). Automatic download provisioning injects and/or embeds UserInfo 14 into a downloadable software program (an Application) used to connect to and operate Internet Services. Using the present invention, the UserInfo 14 does not have to be input by the user. The present invention is for use with Internet Services that require an Application to be downloaded due to performance, persistence, hardware integration, feature requirements, and/or other reasons.

Figure 4:
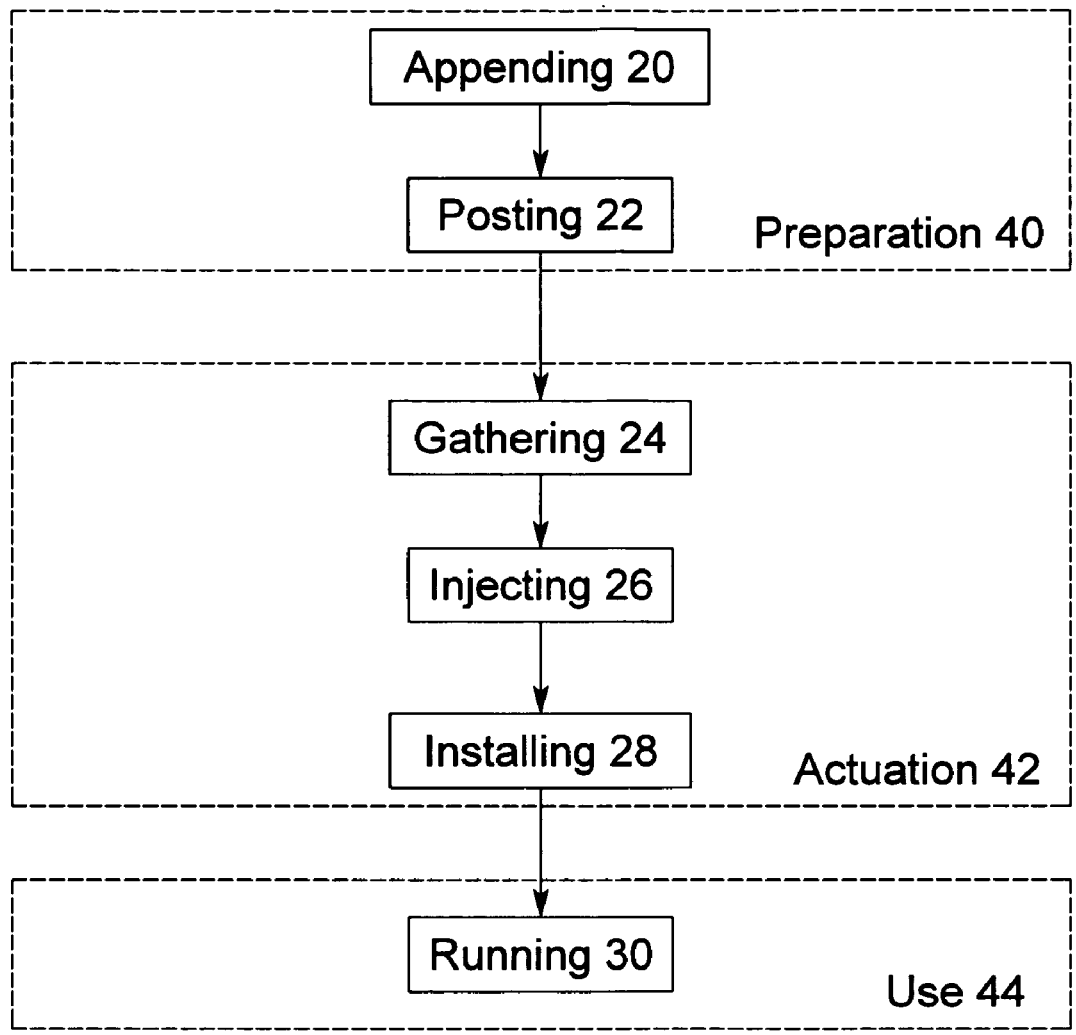
FIG. 4 is a flow chart illustrating one preferred embodiment of the automatic download provisioning system and method of the present invention.
Figure 5:
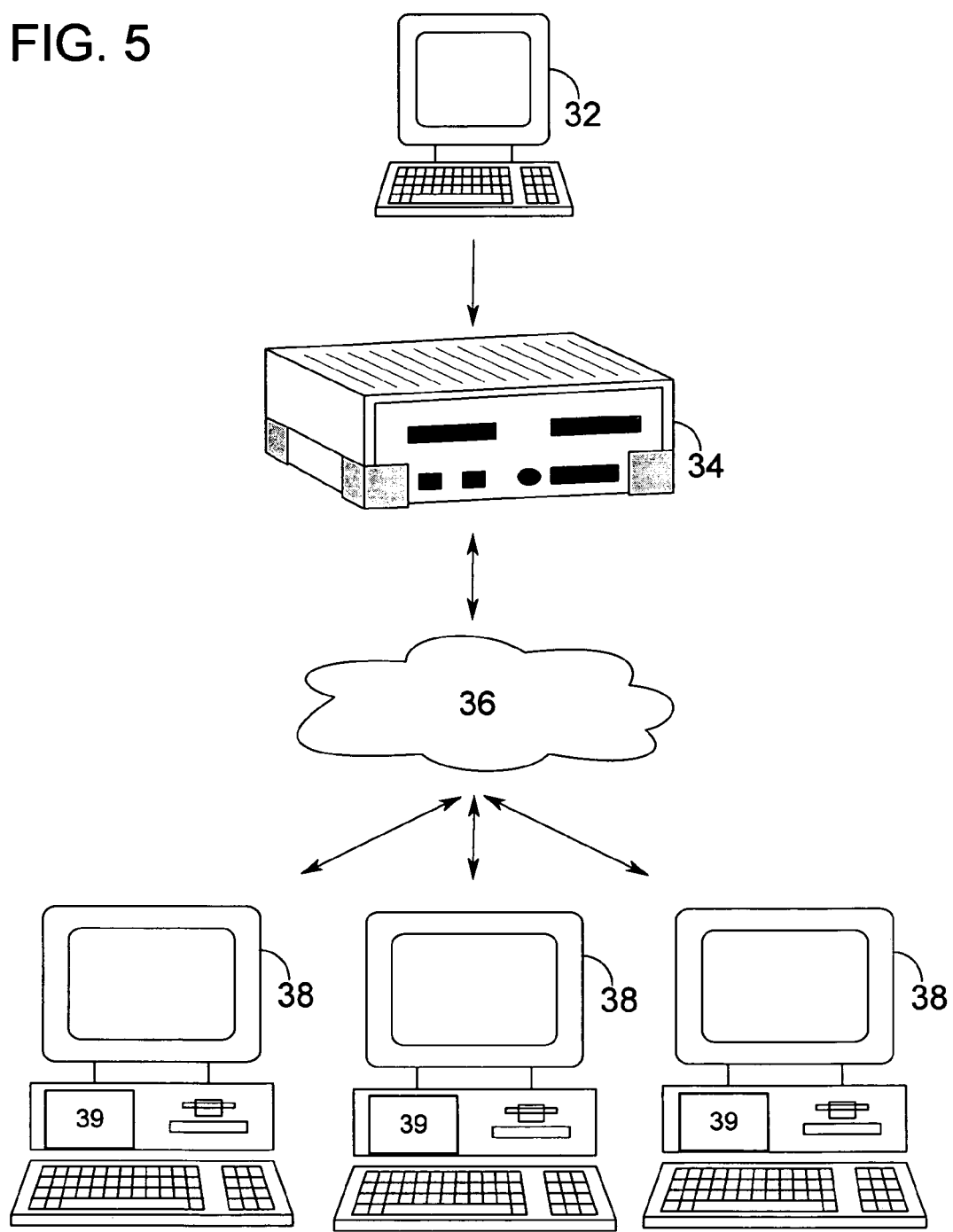
FIG. 5 illustrates a preferred computer environment for implementing the automatic download provisioning system and method of the present invention.
Figure 7:
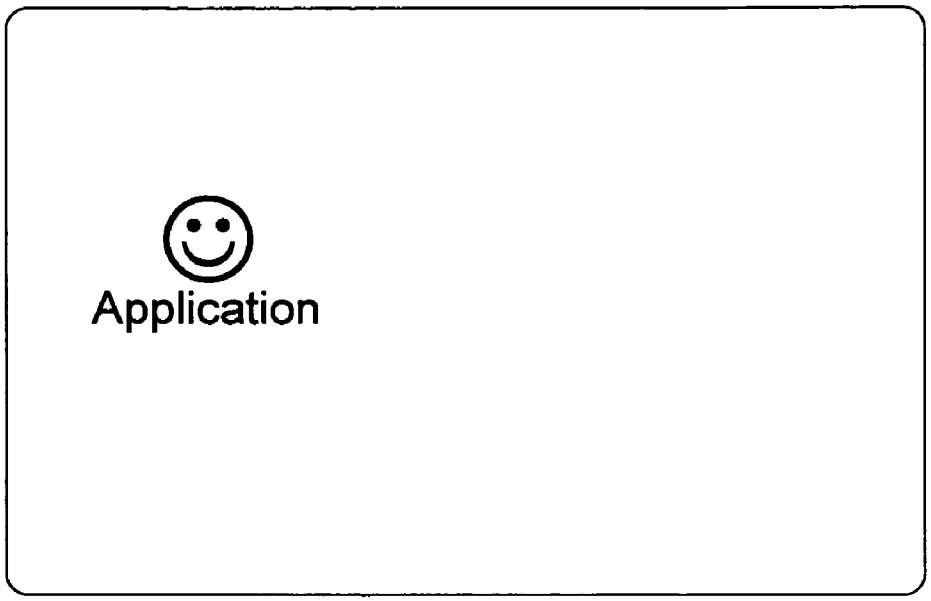
FIG. 7 is an exemplary simplified screen view of a user's desktop in which the Application has been installed.
Figure 8:
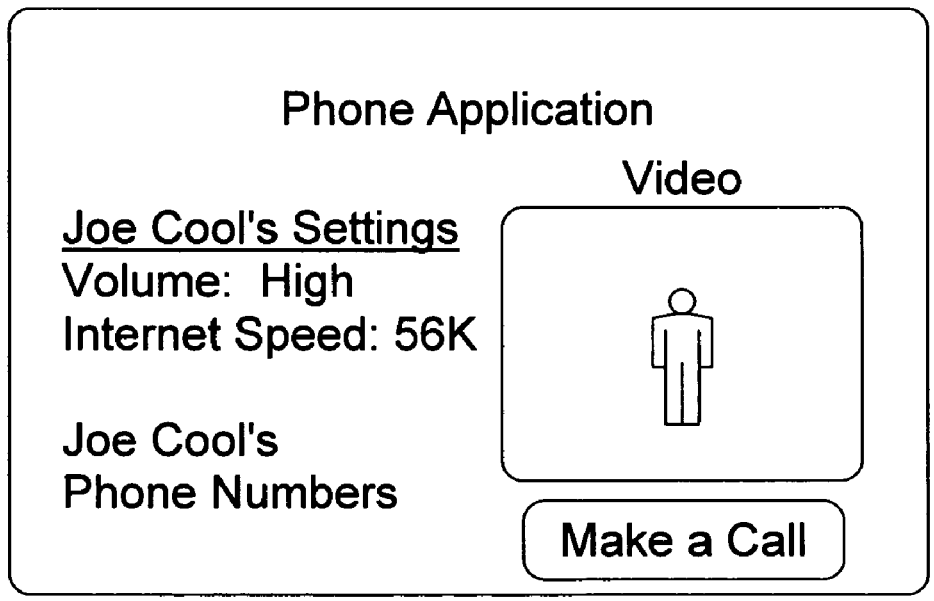
FIG. 8 is an exemplary simplified screen view of the user's computer running the Application with user information that is automatically included.

As shown in FIG. 4, there are six steps in the process of the present invention: Appending 20, Posting 22, Gathering 24, Injecting 26, Installing 28, and Running 30. These steps are performed in an environment such as that shown in FIG. 5 that includes a developer's computer 32, a Web Server 34, a network 36 (e.g. the Internet), and a user's computer 38 having a Registry 39. FIGS. 6-8 are exemplary simplified screen views of how a user would utilize the present invention.

For the purpose of describing the present invention, the following definitions will be used:

| | |
|---|---|
| Application: | The software program used to connect to and operate Internet Services. |
| Download Provisioning: | Injecting UserInfo 14 into a downloadable program (Loader) for installing an Application. |
| Installer 16: | A program that performs one or more of the following steps: present configuration options to the user; check the user's computer 38 for older; incomplete; or corrupt versions; extract and decompress one or more Application files; write the Application files to a folder; write configuration information to the Registry 39; display the "readme" file; launch the Application; and provide a convenient way to uninstall the Application later (required for Microsoft WINDOWS ® logo certification, for example). |
| Internet Service: | A data or voice service that is accessed through a network 36 (e.g. the Internet). The Internet Service may be provided from a server that may be the Web Server 34, or it may be one or more separate servers. |
| Loader 10: | The program, generally implemented in software that, in its "final format" (shown as Loader 10c in FIG. 3), contains the UserInfo 14 and the Installer 16. The Loader 10 also includes the means to write the UserInfo 14 to the Registry 39 and to extract and run the Installer 16. |
| Registry 39: | A place (e.g. a persistent data store such as a hard drive) where configuration information and UserInfo 14 is stored on the user's computer 38. The Registry 39 may be the WINDOWS ® registry, any system-wide database, or a file in an appropriate memory location. |
| Service Provisioning: | Creating an account on an Internet Service provider's network to allow a user to use the Internet Service. |
| Static Buffer 12: | A blank buffer or reserved memory inside the Loader 10 that is large enough to contain the UserInfo 14. |
| UserInfo 14: | The data that is specific to a particular user, including but not necessarily limited to timestamp of download, account name and password, serial number or ID from the user's computer 38, credit card number, name and address, etc., typically used for copy-protection, authentication, access to personalized web pages, and account information (e.g. billing). |
| Web Server 34: | At least one processor accessible via a network 36. In one preferred embodiment, the Web Server 34 is a computer that is responsible for accepting HTTP requests from clients (e.g. Web browsers), and serving the Web pages (e.g. HTML documents and linked objects (images, etc.)) to clients. |

Figure 2:
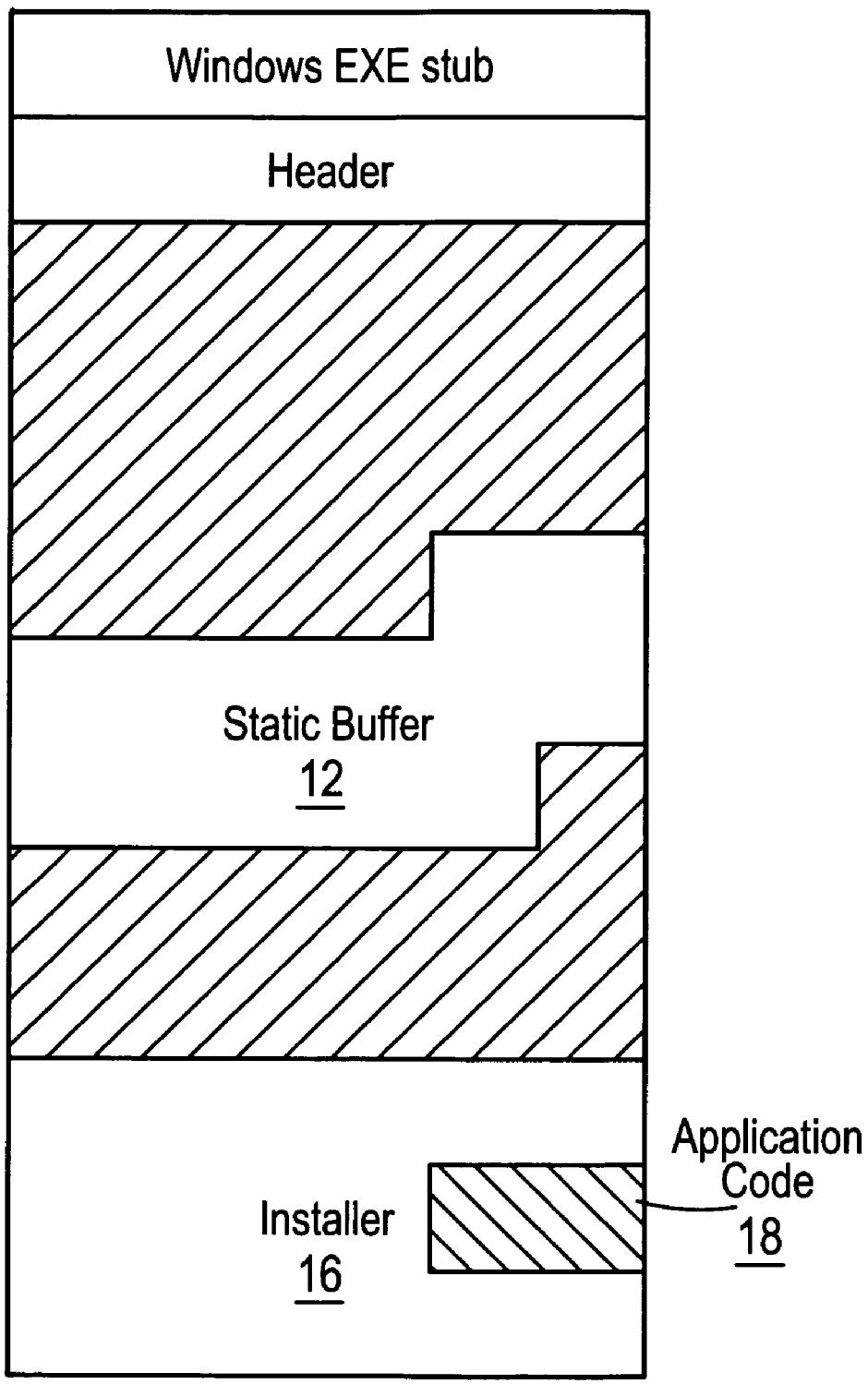
FIG. 2 shows an exemplary Loader having a Static Buffer and an appended Installer.

The six steps shown in FIG. 4 can be further defined as follows:

| | |
|---|---|
| Appending 20: | The first step is to append an Installer 16 to the Loader 10. Although shown as appending the Installer 16 to the end of the Loader 10, it should be noted that "appending" (or "append," "appends" or "appended") is meant to include any method of embedding the Installer 16 to any location (e.g. beginning, middle, or end) of the Loader 10. This step would typically be performed by a utility program run by the developer at the time he builds the Application (the code 18 of which is shown in FIG. 2) and Installer 16. |
| Posting 22: | The second step is posting or placing the Loader 10 on a Web Server 34 along with a script (e.g. download.php) that can gather and/or create the UserInfo 14. This step may be performed by the Internet Service provider. |
| Gathering 24: | The third step is to gather information to create the UserInfo 14 collection of data. This step would be automatically performed by the script (e.g. download.php) implemented on a Web Server 34. |
| Injecting 26: | The fourth step is to inject the UserInfo 14 into the Loader 10. Although shown as injecting the UserInfo 14 into Static Buffer 12 of the Loader 10, it should be noted that "injecting" is meant to include any method of embedding the UserInfo 14. It should also be noted that although the Static Buffer 12 is shown in the middle of the Loader 10, the Static Buffer 12 may be at any |

-continued

|  |  |
|---|---|
|  | location (e.g. beginning, middle, or end) of the Loader 10. This step would be automatically performed by the script (e.g. download.php). |
| Installing 28: | The fifth step is when the user runs the Loader 10 after the Loader 10 is downloaded to the user's computer 38. The Loader 10 writes the UserInfo 14 to the Registry 39. The Loader 10 then extracts and runs the Installer 16. |
| Running 30: | The sixth step is the running of the Application. The Application reads the UserInfo 14 from the Registry 39. The Application may then use information from UserInfo 14 to connect to the Internet Service, authenticate the Application and/or user computer 38 to the Internet Service, and use (or allow the computer user to use) the Internet Service. The Application does not require the UserInfo 14 to be input by the user. |

The steps of the process of the present invention may be performed at different chronological times (i.e. there may be time gaps between the steps) and in different physical locations. For example, the step of Appending 20 may be performed by the developer in advance (e.g. when he builds the Application and Installer 16) on his own computer 32. The step of Posting 22 may be performed by the Internet Service provider in advance when he posts the Loader 10 and script on a Web Server 34, which may be physically distinct from the developer's computer 32. The steps of Gathering 24 and Injecting 26 may be performed by the Web Server 34 just prior to downloading the Loader 10 from the Web Server 34 to the user's computer 38. The steps of Installing 28 and Running 30 are performed after downloading. For example, during the step of Installing 28, the UserInfo 14 may be written to the Registry 39 and the Application may be installed on the user's computer 38 substantially immediately after downloading or at a later time at the request of the user. The step of Running 30 the Application so that the user can use the Internet Service may be performed on the user's computer 38 (but accessing an Internet Service over the Internet 36) substantially immediately after downloading and/or at a later time at the request of the user.

The steps can be thought of as being divided into the broader categories of Preparation 40, Actuation 42, and Use 44. The steps of Appending 20 and Posting 22 are in the Preparation 40 category in which the Loader 10 is prepared and made available to a user. The steps of Gathering 24, Injecting 26, and Installing 28 are in the Actuation 42 category in which the Loader 10 is actuated and implemented. The steps in the Actuation 42 category generally happen automatically when the user requests access to the Internet Service. It should be noted, however, that some steps in the Actuation 42 category may be designed to allow and/or require additional user intervention. For example, the Installing 28 step may require that the user "click" a box confirming that the user wants to install the Application, agrees to a license, or agrees to terms of service. The step of Running 30 is in the Use 44 category in which the user can use the Application.

As set forth above, the Preparation 40 category includes the steps of Appending 20 and Posting 22. During Preparation 40, the Loader 10 is prepared and made available to at least one user via his user computer 38.

Figure 1:
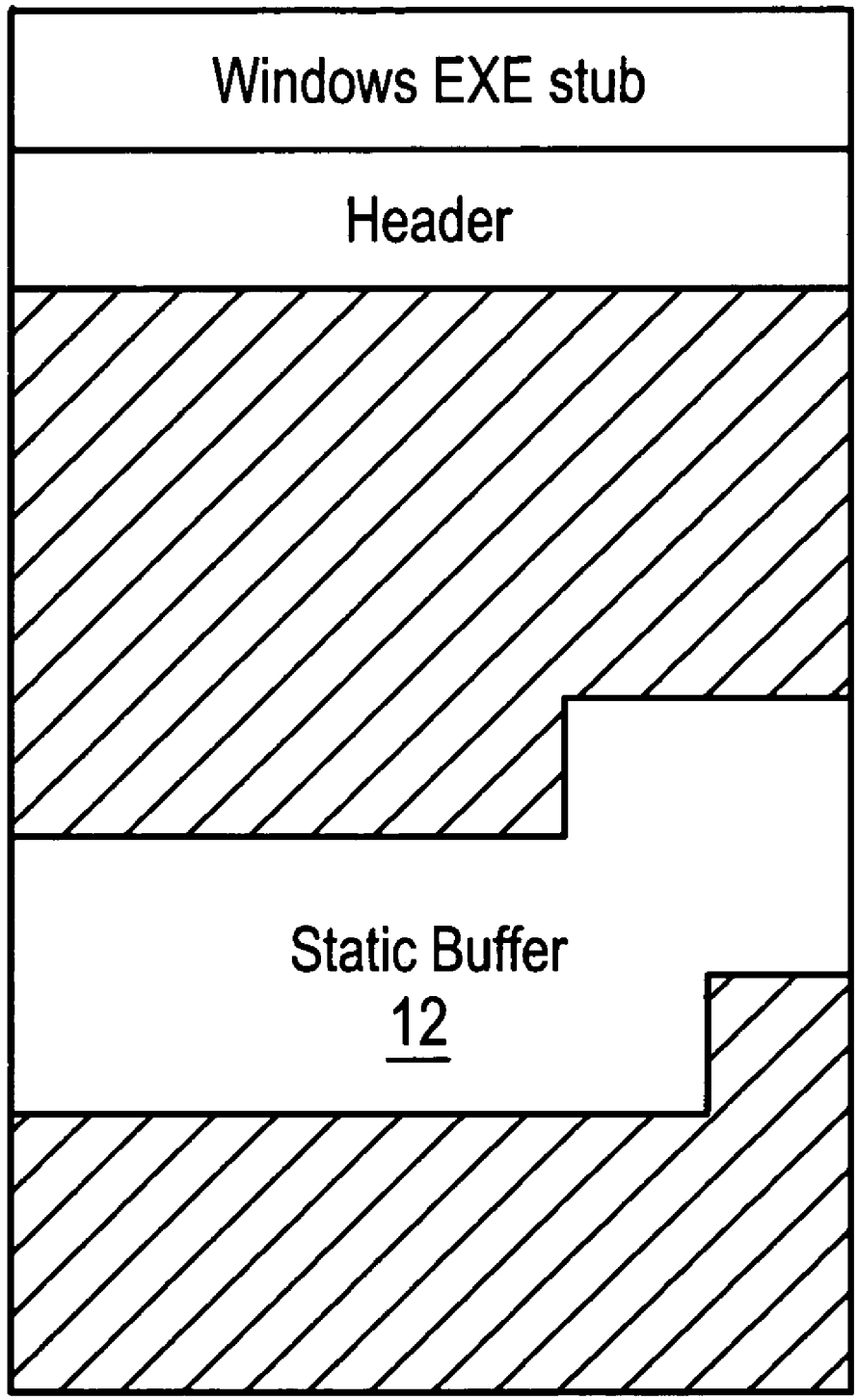
FIG. 1 shows an exemplary empty Loader having a Static Buffer.

FIG. 1 shows an exemplary empty Loader 10a (e.g. a Loader suitable for running on WINDOWS®) that includes the code for the Loader 10. The empty Loader 10a also includes a blank buffer (shown as Static Buffer 12) inside it. The Static Buffer 12 should be large enough to contain the UserInfo 14. The Loader 10a also includes any code necessary to run. Exemplary code is shown in FIG. 1 as the WINDOWS® EXE (executable) stub and the header. Code for an exemplary empty loader can be found at loader\main.c.

The developer creates the Installer 16 as a step in developing the Application. A utility program executed by the developer appends the Installer 16 into the Loader 10 in the Appending 20 state. Code for an exemplary utility program for appending can be found at tag\main.c: Function AddFileToResource( ).

FIG. 2 shows an exemplary Loader 10b having a Static Buffer 12 and an appended Installer 16. At this point the Static Buffer 12 is still "empty" (or contains unusable, or unnecessary data), but the UserInfo 14 will be written here later. It is in this format that the Loader 10b is uploaded to the Internet Service provider's website or Web Server 34 in the Posting 22 step. The Posting 22 step may also include posting a special script (e.g. download.php) to the Internet Service provider's website or Web Server 34.

It should be noted that the developer and the Internet Service provider have one or more means for transmitting (including means to send, transmit, upload, and/or otherwise transfer) the Loader 10b to the Web Server 34. These means for transmitting may include any means by which programs and/or data may be transmitted including, but not limited to, manual input (e.g. typing), transferring from other memory (e.g. from a floppy disk or from a networked hard disk), downloading via the Internet, and any other I/O mechanisms known or yet to be discovered. It should be noted that the means for transmitting may be carried out in multiple steps where the first step is to transmit the Loader 10b to the Internet Service provider and the second step is to post (e.g. the Posting 22 step) the Loader 10b to the Web Server 34. It should also be noted that the Web Server 34 has means for receiving the Loader 10b. These means for receiving may include any means by which programs and/or data may be received and stored including, but not limited to, manual input (e.g. typing), storing from other memory (e.g. from a floppy disk or from a networked hard disk), uploading via the Internet, and any other I/O mechanisms known or yet to be discovered.

As set forth above, the Actuation 42 category includes the steps of Gathering 24, Injecting 26, and Installing 28. During the Actuation 42 category, the Loader 10 is actuated and implemented.

After the user accesses the web page (e.g. FIG. 6) on the Web Server 34 for performing Service Provisioning and fills out a series of questions, the user confirms that he wants to install the Application.

At this point, the process of the present invention enters the gathering 24 step. A special script (e.g. download.php) gathers user input information (e.g. name, address, credit card number), determinable information (e.g. an email address that may be determinable by the Internet Service without the user having to enter the information), and generated information (e.g. access codes and/or a username). Some, but not necessarily all, of this information is assembled into the UserInfo 14. Exemplary code for assembling can be found at webpage.htm.

Figure 3:
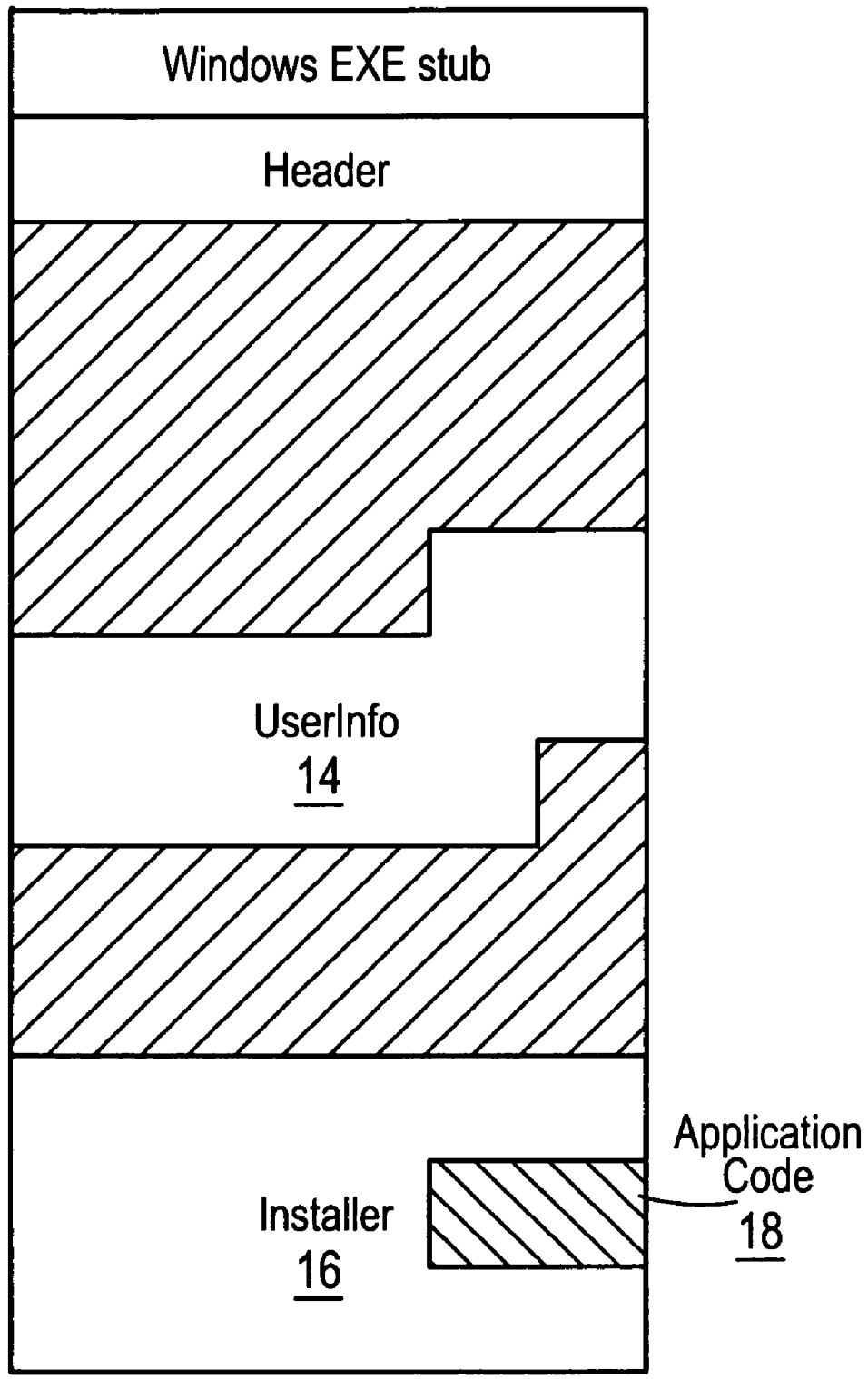
FIG. 3 shows an exemplary loader having UserInfo inserted into a Static Buffer and an appended Installer.

In the Injecting 26 step, the script makes a "copy" of the Loader 10b with the Installer 16, and writes the UserInfo 14 into the Static Buffer 12 of the "copy." Code for an exemplary injecting step can be found at download.php: Functions injectdownload( ), InjectString( ), and LocateInjection Point( ). It should be noted that the "copy" may be the version read into memory by the Loader. Alternatively, the script may simply inject or overwrite the Static Buffer 12 of the original Loader 10*b* with the UserInfo 14. The final Loader 10*c* looks like FIG. 3. FIG. 3 shows an exemplary loader having UserInfo 14 injected into a Static Buffer 12 and an appended Installer 16.

It should be noted that the Web Server 34 has means for transmitting (including means to send, transmit, upload, and/or otherwise transfer) the Loader 10*c* to the user's computer 38. These means for transmitting may include any means by which programs and/or data may be transmitted including, but not limited to, transferring from other memory (e.g. from a networked hard disk), downloading via the Internet, and any other I/O mechanisms known or yet to be discovered. It should also be noted that the user's computer 38 has means for receiving the Loader 10*c*. These means for receiving may include any means by which programs and/or data may be received and stored including, but not limited to, storing from other memory (e.g. from a networked hard disk), uploading via the Internet, and any other I/O mechanisms known or yet to be discovered.

The Installing 28 step may be automatic or may require that the user confirm that he wants to download and/or install the Application. The Loader 10, however, is downloaded to the user's computer 38 and then the Application is installed on the user's computer 38 using the code 18. The exemplary code for this can be found in Download.php: as indicated, function linktopage( ) and class DownloadObj.

During the Installing 28 step, the Loader 10 writes the UserInfo 14 to the Registry 39. Exemplary code for writing UserInfo to the Registry can be found at loader\main.c: Functions ProcessBuffer( ), SetShellRegBin( ), SetShellRegVal( ), SetShellRegText( ), SetRegBinary( ), and SetRegString( ). Loader 10 writes the UserInfo 14 to the Registry 39 using means for writing (including, but not limited to, an executable code from the Loader 10 directing the writing of the data) and any writing means known or yet to be discovered. Then, the Loader 10 extracts the Installer 16 using means for extracting such as copying or an extraction algorithm. Once extracted, the Installer 16 uses means for installing the Application onto the user computer 38. Exemplary code for installing (e.g. extracting and executing) can be found at Loader\main.c: Function LaunchResourceApp. Specifically, the Installer 16 extracts all of the files required by the Application, writes them to the appropriate folder(s), and optionally writes additional information or configuration parameters to the Registry 39 or other appropriate place(s). During the Installing 28 step, the Application may read some or all of the UserInfo 14.

As set forth above, the Use 44 category includes the step of Running 30. During the Use 44 category, the user can use the Application.

During the Running 30 step, the Application reads the UserInfo 14 from the Registry 39. Also, the Application can connect to the Internet Service without any input required from the user. During the Running 30 step, the Application may read some or all of the UserInfo 14. This creates an easy, pleasurable experience for the user using the Internet Service.

FIGS. 6-8 are exemplary simplified screen views of how a user would utilize the present invention. Specifically, a user who desires to use an Internet Service would access the Internet Service web page and fill out a series of questions such as those shown in FIG. 6. Upon completion of the questions, the user would "click" a box confirming that the user wants to install the Application. Although not shown in the figures, the user might see an hour glass indicating the passage of time, one or more status bars showing the progress of the "installation" process, and/or content (e.g. a short instructional video or advertisements) while he waits. The user might also be separately prompted to confirm that he wants to install the Application on his computer 38. Once the Application is installed, the user might see an icon (FIG. 7) on his desktop that he could "click" to use 44 the Application. When running the Application, the user may notice that his user information was automatically included without having to separately input this information (FIG. 8).

Figure 9:
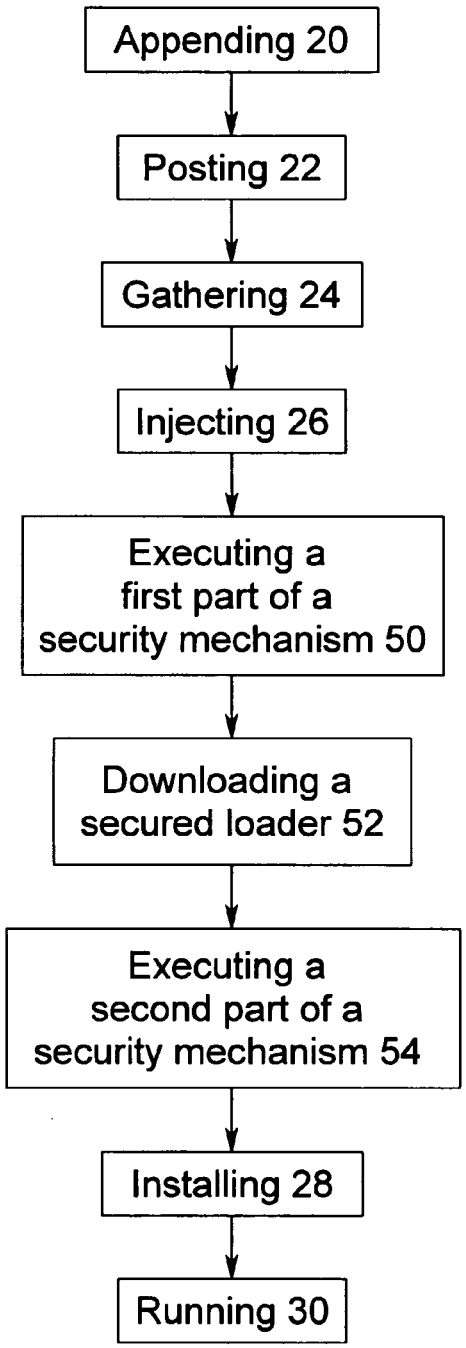
FIG. 9 is a flow chart illustrating a first exemplary preferred embodiment of using an automatic download provisioning system and method of the present invention with security mechanisms.
Figure 10:
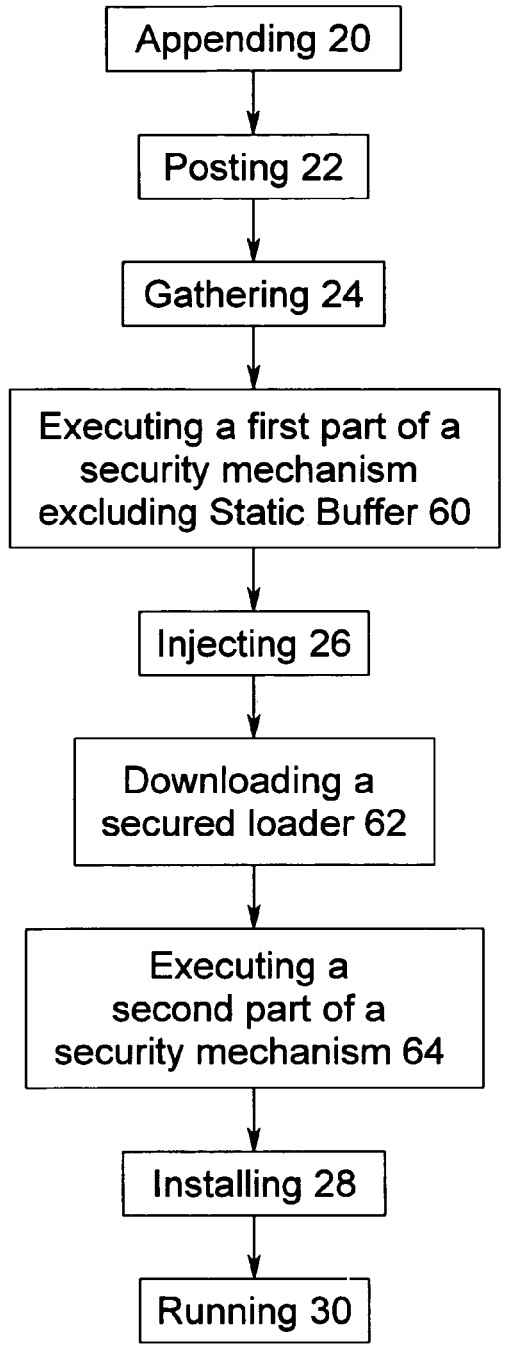
FIG. 10 is a flow chart illustrating a second exemplary preferred embodiment of using an automatic download provisioning system and method of the present invention with security mechanisms.

It should be noted that the present invention may be used in conjunction with digital certificates, electronic signatures, cryptographic protocols, or other security mechanisms designed to provide secure communications and data transfer over a network. These security mechanisms may provide security by providing authentication services, preventing eavesdropping, preventing tampering, preventing message forgery, preventing introduction of viruses, and otherwise increasing security. Exemplary security mechanisms include, but are not limited to authentication certificates provided by THAWTE™ and VERISIGN®. These exemplary security mechanisms use Secure Socket Layer (SSL) to provide endpoint authentication and communication privacy using a public key encryption-based key exchange and certificate-based authentication to transfer records. The exemplary security mechanisms use a signature algorithm with a complementary verification algorithm. The output of the signature algorithm is called a digital signature. Each record can be optionally compressed, encrypted, and packed with a message authentication code (MAC). As shown in FIG. 9, one exemplary method by which the present invention is able to work in conjunction with security mechanisms calculates the signature (e.g. runs the signature algorithm) after the UserInfo 14 has been injected into the Static Buffer 12. FIG. 9 shows this by adding the steps of executing a first part of a security mechanism 50 (e.g. a signature algorithm), downloading a secured loader 52, and executing a second part of a security mechanism 54 (e.g. a verification algorithm). In this case, these three steps 50, 52, 54 are performed after the Injecting 26 step. As shown in FIG. 10, a second exemplary method by which the present invention is able to work in conjunction with security mechanisms excludes the Static Buffer 12 when calculating the signature. As with FIG. 9, FIG. 10 shows this by adding the steps of executing a first part of a security mechanism 60 (e.g. a signature algorithm), downloading a secured loader 62, and executing a second part of a security mechanism 64 (e.g. a verification algorithm). However, in this case, the step of executing a first part of a security mechanism 60 excludes the Static Buffer 12 and may be preformed prior to the Injecting 26 step. It should be noted that the step of executing a first part of a security mechanism 60 could also be preformed earlier in the process (e.g. before the Gathering 24 step).

It should be noted that the present invention may be implemented using one or more software programs or using a plurality of modules of a single software program. Aspects of the present invention may also be implemented using other means for directing a processor (e.g. firmware). It should be noted that the term "computer" is meant to include any processing device including, but not limited to a personal computer, a laptop computer, a server, a smart phone, a personal data assistant, or a hybrid device.

Appendix A is a source code for an exemplary program as described above, which contains the following software components: main.c, main.h, main.c, dwpacct.h, dwpacct.c, download.php, and webpage.htm. These software components are included on the two identical CDs that are submitted with this application, and this material on the CDs is incorporated into this specification by reference.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. An automatic download provisioning method, said method comprising the steps of:
   (a) appending an Installer into a Loader;
   (b) gathering UserInfo;
   (c) injecting said UserInfo into said Loader; and
   (d) transmitting said Loader to a user computer, where said Loader writes said UserInfo into a Registry of said user computer,
   wherein said UserInfo is injected into said Loader prior to said transmitting of said Loader to said user computer.

2. The method of claim 1, wherein said step of appending further comprises the step of appending an Installer into a Loader having a Static Buffer, and said step of injecting further comprises the step of injecting UserInfo into said Static Buffer of said Loader.

3. The method of claim 1, further comprising the further steps of said Loader extracting said Installer onto said user computer and said Installer installing an Application onto said user computer.

4. The method of claim 1, wherein said step of appending further comprises the step of appending an Installer of an Application into said Loader, said method further comprising the step of said Application reading said UserInfo.

5. The method of claim 1, wherein said step of injecting is performed by a Web Server.

6. The method of claim 1, further comprising the step of downloading said Loader from a Web Server to said user computer prior to writing said UserInfo into said Registry.

7. The method of claim 1, further comprising the steps of:
   (a) executing a first part of a security mechanism to create a secured Loader;
   (b) downloading said secured Loader; and
   (c) executing a second part of said security mechanism.

8. The method of claim 7, wherein said step of executing a first part of a security mechanism to create a secured Loader is performed after said step of injecting said UserInfo into said Loader.

9. The method of claim 7, said step of injecting further comprises the step of injecting UserInfo into a Static Buffer of said Loader, and said step of executing a first part of a security mechanism to create a secured Loader excludes said Static Buffer.

10. An automatic download provisioning system for downloading an Application that connects to and operates a data or voice service, the system implemented on a Web Server accessed by a user computer having a Registry, said system comprising:
    (a) means for receiving a Loader, said Loader having a Static Buffer and an appended Installer;
    (b) means for gathering UserInfo;
    (c) means for injecting said UserInfo into said Static Buffer of said Loader; and
    (d) means for transmitting said Loader to said user computer,
    wherein said means for injecting said UserInfo is configured to inject said UserInfo into said Static Buffer of said Loader prior to transmitting said Loader to said user computer.

11. The system of claim 10, further comprising means for appending said Installer into said Loader.

12. The system of claim 10, further comprising means for writing said UserInfo into said Registry of said user computer.

13. The system of claim 10, further comprising said Loader having means for extracting said Installer onto said user computer and said Installer having means for installing an Application onto said user computer.

14. The system of claim 10, further comprising means for said Application reading said UserInfo.

15. The system of claim 10, wherein said Web Server implements said means for injecting said UserInfo into said Static Buffer of said Loader.

16. The system of claim 10, further comprising:
    (a) means for executing a first part of a security mechanism to create a secured Loader;
    (b) means for downloading said secured Loader; and
    (c) means for executing a second part of said security mechanism.

17. A method for providing an automatic download provisioning system for downloading an Application that connects to and operates a data or voice service, said method at least partially implemented on a Web Server for access by at least one user computer having a Registry, said method comprising the steps of:
    (a) appending an Installer to a Loader having a Static Buffer;
    (b) posting said Loader on said Web Server;
    (c) gathering UserInfo;
    (d) injecting said UserInfo into said Static Buffer; and
    (e) transmitting said Loader to said at least one user computer,
    wherein said UserInfo is injected into said Static Buffer prior to said transmitting of said Loader to said user computer.

18. The method of claim 17, further comprising the steps of:
    (a) receiving said Loader from said Web Server; and
    (b) extracting said Installer from said Loader.

19. The method of claim 18, further comprising the step of writing said UserInfo into said Registry of said user computer.

20. The method of claim 18, further comprising the step of installing said Application onto said at least one user computer.

21. The method of claim 17, wherein said step of gathering is implemented by said Web Server.

22. The method of claim 17, wherein said step of injecting is implemented by said Web Server.

23. The method of claim 17, further comprising the steps of:
    (a) executing a first part of a security mechanism to create a secured Loader;
    (b) downloading said secured Loader; and
    (c) executing a second part of said security mechanism.

24. The method of claim 23, wherein said step of executing a first part of a security mechanism to create a secured Loader is performed after said step of injecting said UserInfo into said Loader.

25. The method of claim 23, wherein said step of executing a first part of a security mechanism to create a secured Loader excludes said Static Buffer.

* * * * *